(12) United States Patent
Felts (10) Patent No.: US 9,477,462 B2
(45) Date of Patent: Oct. 25, 2016

(54) SYSTEM AND METHOD FOR SOFTWARE PRODUCT VERSIONING PACKAGING, DISTRIBUTION, AND PATCHING

(75) Inventor: David Felts, Denville, NJ (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1027 days.

(21) Appl. No.: 12/355,681

(22) Filed: Jan. 16, 2009

(65) Prior Publication Data

US 2009/0183150 A1 Jul. 16, 2009

Related U.S. Application Data

(60) Provisional application No. 61/021,573, filed on Jan. 16, 2008.

(51) Int. Cl.
*G06F 9/44* (2006.01)
*G06F 9/445* (2006.01)

(52) U.S. Cl.
CPC . *G06F 8/71* (2013.01); *G06F 8/60* (2013.01); *G06F 9/44505* (2013.01)

(58) Field of Classification Search
CPC .............................................. G06F 8/60–8/77
USPC ................................................. 717/168–178
See application file for complete search history.

(56) References Cited

U.S. PATENT DOCUMENTS

| | | | |
|---|---|---|---|
| 5,237,688 A * | 8/1993 | Calvert et al. | 717/121 |
| 5,504,852 A | 4/1996 | Thompson-Rohrlich | |
| 5,553,290 A | 9/1996 | Calvert et al. | |
| 5,953,533 A | 9/1999 | Fink et al. | |
| 6,282,711 B1 | 8/2001 | Halpern et al. | |
| 6,360,255 B1 | 3/2002 | McCormack | |
| 6,370,686 B1 * | 4/2002 | Delo et al. | 717/174 |
| 6,381,742 B2 * | 4/2002 | Forbes et al. | 717/176 |
| 6,418,554 B1 * | 7/2002 | Delo et al. | 717/174 |

(Continued)

FOREIGN PATENT DOCUMENTS

WO WO0077614 12/2000

OTHER PUBLICATIONS

G. Brunetti, B. Golob, "A feature-based approach towards an integrated product model including conceptual design information", Computer-Aided Design, vol. 32, Issue 14, Dec. 2000, pp. 877-887.*

(Continued)

*Primary Examiner* — Francisco Aponte
(74) *Attorney, Agent, or Firm* — Tucker Ellis LLP (57) ABSTRACT

A system and method for software product versioning, packaging, distribution, and patching. The system provides for convergence of registry models, adding critical information to a home registry and simplifying processing algorithms in the install framework. In accordance with an embodiment, a product alias element is added to a Product Provisioning model, referencing one or more products. This provides a loose coupling between the external market-oriented product name and version, and the internal product names and versions. The internal product names and versions are captured in the registry and used for all code-based decisions during installation and other provisioning related activities. In accordance with an embodiment, a Feature Model is also added to the Product Provisioning model, and modules are grouped under features.

19 Claims, 3 Drawing Sheets

(56) References Cited

U.S. PATENT DOCUMENTS

| | | |
|---|---|---|
| 6,442,754 B1 | 8/2002 | Curtis |
| 6,487,713 B1* | 11/2002 | Cohen .................. G06F 8/34 |
| | | 717/105 |
| 6,615,405 B1* | 9/2003 | Goldman et al. ............. 717/174 |
| 6,681,391 B1 | 1/2004 | Marino et al. |
| 6,698,018 B1 | 2/2004 | Zimniewicz et al. |
| 7,013,461 B2 | 3/2006 | Hellerstein et al. |
| 7,076,496 B1 | 7/2006 | Ruizandrade |
| 7,210,125 B2* | 4/2007 | Chang ................. G06F 9/44505 |
| | | 707/999.103 |
| 7,222,341 B2* | 5/2007 | Forbes et al. ................. 717/170 |
| 7,231,410 B1* | 6/2007 | Walsh et al. |
| 7,266,817 B1* | 9/2007 | Barrett .................... G06F 8/71 |
| | | 717/120 |
| 7,370,092 B2 | 5/2008 | Aderton et al. |
| 7,478,093 B2 | 1/2009 | Moulckers et al. |
| 7,487,536 B2 | 2/2009 | Sakurai et al. |
| 7,519,964 B1 | 4/2009 | Islam et al. |
| 7,546,594 B2* | 6/2009 | McGuire .................. G06F 8/68 |
| | | 717/168 |
| 7,613,789 B2 | 11/2009 | Cacenco et al. |
| 7,620,948 B1 | 11/2009 | Rowe et al. |
| 7,640,542 B2 | 12/2009 | Herenyi et al. |
| 7,703,090 B2 | 4/2010 | Napier et al. |
| 7,861,239 B2* | 12/2010 | Mayfield ............. G06F 11/1433 |
| | | 717/168 |
| 7,865,888 B1* | 1/2011 | Qureshi .................. G06N 5/048 |
| | | 717/168 |
| 7,930,273 B1* | 4/2011 | Clark ........................ G06F 8/71 |
| | | 707/638 |
| 7,984,436 B1* | 7/2011 | Murray ........................ 717/175 |
| 8,375,381 B1* | 2/2013 | Clark ........................ G06F 8/71 |
| | | 717/170 |
| 8,387,037 B2 | 2/2013 | Henseler .................... G06F 8/63 |
| | | 717/168 |
| 8,645,939 B2* | 2/2014 | Felts ............................ 717/169 |
| 2002/0010910 A1* | 1/2002 | Crudele et al. .................... 717/4 |
| 2002/0100036 A1 | 7/2002 | Moshir et al. |
| 2002/0129356 A1 | 9/2002 | Hellerstein et al. |
| 2002/0154555 A1* | 10/2002 | Krueger et al. ............. 365/200 |
| 2002/0188941 A1 | 12/2002 | Cicciarelli et al. |
| 2003/0051236 A1* | 3/2003 | Pace et al. ..................... 717/177 |
| 2003/0145317 A1 | 7/2003 | Chamberlain |
| 2004/0034850 A1 | 2/2004 | Burkhardt et al. |
| 2004/0046785 A1* | 3/2004 | Keller ........................... 345/734 |
| 2004/0093593 A1* | 5/2004 | Jhanwar et al. ............. 717/169 |
| 2004/0210653 A1 | 10/2004 | Kanoor et al. |
| 2005/0015761 A1 | 1/2005 | Chang et al. |
| 2005/0066324 A1 | 3/2005 | Delgado et al. |
| 2005/0177826 A1* | 8/2005 | Miller ................. G06F 9/44536 |
| | | 717/170 |
| 2006/0064382 A1 | 3/2006 | Cognigni et al. |
| 2006/0080656 A1 | 4/2006 | Cain et al. |
| 2006/0101450 A1 | 5/2006 | Datta et al. |
| 2006/0123409 A1 | 6/2006 | Jordan, III et al. |
| 2006/0130047 A1 | 6/2006 | Burugapalli |
| 2006/0161916 A1 | 7/2006 | May et al. |
| 2006/0184926 A1 | 8/2006 | Or et al. |
| 2006/0206757 A1 | 9/2006 | Russell et al. |
| 2006/0224544 A1 | 10/2006 | Keith, Jr. |
| 2006/0230314 A1* | 10/2006 | Sanjar ........................ G06F 8/61 |
| | | 714/26 |
| 2006/0265702 A1* | 11/2006 | Isaacson et al. ............. 717/168 |
| 2006/0277542 A1* | 12/2006 | Wipfel ........................ 717/174 |
| 2007/0033586 A1 | 2/2007 | Hirsave et al. |
| 2007/0038642 A1 | 2/2007 | Durgin et al. |
| 2007/0169079 A1 | 7/2007 | Keller et al. |
| 2007/0169114 A1* | 7/2007 | Birk Olsen et al. .......... 717/174 |
| 2007/0289027 A1 | 12/2007 | Johnson et al. |
| 2008/0046882 A1 | 2/2008 | Blackhouse |
| 2008/0082974 A1* | 4/2008 | Ellison ...................... G06F 8/71 |
| | | 717/170 |
| 2008/0127175 A1 | 5/2008 | Naranjo et al. |
| 2008/0163192 A1 | 7/2008 | Jha et al. |
| 2008/0163199 A1 | 7/2008 | Rao et al. |
| 2008/0209400 A1 | 8/2008 | Parker |
| 2008/0222626 A1 | 9/2008 | Kumar Hirsave et al. |
| 2008/0235633 A1 | 9/2008 | Ghiloni |
| 2009/0144716 A1 | 6/2009 | Felts |
| 2009/0144726 A1 | 6/2009 | Felts |
| 2009/0144727 A1 | 6/2009 | Felts |
| 2009/0144728 A1 | 6/2009 | Felts |
| 2009/0259999 A1 | 10/2009 | Srinivasan |

OTHER PUBLICATIONS

A Versioning Model for Enterprise Services—Rainer Weinreich, University of Linz, Austria—Thomas Ziebermayr, Dirk Draheim, SCC Hagenberg, Austria—21st International Conference on Advanced Information Networking and Applications Workshops (AINAW'07)—2007.*

HP User's Guide, "Software Package Builder 2.0 User's Guide for HP_UX 11i and 11i v2", Edition 1, Sep. 2004, pp. 1-86.

HP, "Packaging Applications in Software Distributor Format Using Software Package Builder", pp. 1-22.

Cederqvist et al. Version Management with CVS for CVS 1.11.23, pp. 1-190.

EMCO MSI Package Builder Tutorial, http://ww.emco.is/products/msi-package-builder/tutorial, Nov. 2008, 1 page.

Novell, Novell ZENworks Software Packaging, http://www.novell.com/products/zenworks/softwarepackaging/overview.html., Nov. 2008, 1 page.

HP, "Software Distributor Administration Guide for HP-UX 11i HP Computers", Edition 3, Jun. 2002, pp. 1-518.

IBM, Packaging Software with RMP, Part 1, http://www.ibm.com/developerworks/library/1-rpml, Nov. 2008, pp. 1-6.

Hewlett-Packard Company, "Software Distributor Administration Guide for HP-UX11i", Jun. 2002, Edition 3, 518 pages.

Novell Zen Works Software Packaging, http://www.novell.com/products/zenworks/softwarepackaging/overview.html, Nov. 28, 2008, 1 page.

Packaging Software with RPM, Part 1, https://www.ibm.com/developerworks/library/1-rpm1/, Nov. 28, 2008, 6 pages.

Hewlett-Packard Company, Software Package Builder 2.0 User's Guide for HP-UX 11i v1 and 11i v2, Sep. 2004, 86 pages.

Hewlett Packard, "Packaging Applications in Software Distributor Format Using Software Package Builder", Sep. 2003, 22 pages.

Cederovist et al., "Version Management with CVS", http://ftp.gnu.org/non-gnu/cvs/source/stable/1.11.23/cederqvist-1.11.23.pdf, 1993-2008, 190 pages.

EMCO MSI Package Builder—Tutorials, http://emcosoftware.conn/msi-package-builder/tutorials.php, Nov. 28, 2008, 1 page.

OSGi Service Platform Release 2, Open Services Gatewa Initiative, Oct. 2001, 7 pages.

* cited by examiner

SYSTEM AND METHOD FOR SOFTWARE PRODUCT VERSIONING PACKAGING, DISTRIBUTION, AND PATCHING

CLAIM OF PRIORITY

This application claims the benefit of priority to U.S. Provisional Patent application titled "SYSTEM AND METHOD FOR SOFTWARE PRODUCT VERSIONING PACKAGING, DISTRIBUTION, AND PATCHING", Application No. 61/021,573, filed Jan. 16, 2008, and incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is generally related to distribution of software products, and in particular to a system and method for software product versioning, packaging, distribution, and patching.

BACKGROUND

Software products are generally shipped by software vendors as individual versions of their product, with each successive version being identified by a different version number (for example, version 1.0, version 1.1, version 2.0). In a complex software product, such as an enterprise system product, it is also common for a particular version of the product to be provided with cumulative sub versions or service packs (for example, a 2.0 version of the product may be updated to version 2.0.1, or version 2.0.SP1). In some instances a software "patch" can be provided to patch an existing version of the product (for example, the product may be updated or patched from a version 2.0 to a patched version 2.0). Patching may be used to introduce new components into the system, or to address a particular shortcoming, feature or flaw in an existing version of the product. Such additional components, service packs, and patches are often generated and provided after the product has shipped, in response to customer requests for modified features, or to fix software bugs that are only discerned after the product has been in use for some time.

In the field of enterprise software systems, such as application servers, most software companies ship their products on a platform paradigm, wherein the products are generally sold as a platform or suite of products. As such, updates to a portion of the platform or suite must be coordinated so that they do not conflict with other portions of the platform or suite. This can complicate the process of providing updates, and causes delays in providing those updates to the end customer.

SUMMARY

Disclosed herein is a system and method for software product versioning, packaging, distribution, and patching. In accordance with an embodiment of the present invention, the system provides for convergence of Global Product Registry (GPR) and registry models, adding critical information to the home registry and simplifying processing algorithms in the install framework. This allows a business to enforce cross-product dependencies during un-installation, and facilitates an interface to create a list of modules along with normalized start levels based on activation requests for products, components or specific features.

In accordance with an embodiment, a Product Alias element is added to the Product Provisioning Model that is implemented by the system, referencing one or more products. This provides a loose coupling between the external market-oriented product name and version and the internal product names and versions. The internal product names and versions are captured in the registry and used for all code-based decisions during installation and other provisioning related activities. In accordance with an embodiment, a Feature Model is also added to the Product Provisioning Model. A feature is referenced by components in the Product Model and serves as a bridge linking install and runtime aspects of an artifact or module. Features are versioned and contain a group of versioned modules. In accordance with an embodiment, modules are grouped under features. Modules can be designated as "shared". Shared modules do not belong to any specific product but rather are targeted for distribution with two or more products requiring the same unit of functionality.

DETAILED DESCRIPTION

As described above, software products are generally shipped by software vendors as individual versions of their product, with each successive version being identified by a different version number. In a complex software product, such as an enterprise system product, it is also common for a particular version of the product to be provided with cumulative sub versions or service packs. In some instances a software patch can be provided to patch an existing version of the product. Patching may be used to introduce new components into the system, or to address a particular shortcoming, feature or flaw in an existing version of the product.

Considered altogether, the various means of providing versions, components, and patches to a software product are referred to as a Product Provisioning model, configuration, or schema, that in turn is implemented or used by the system. As used herein the term "model" is used to refer to specific models defined by a schema, for example a Global Product Registry (GPR), or a file definition model, in addition to overarching logical models such as a Product Provisioning Model. The Product Provisioning Model includes all models relevant to distribution and tracking of software as it evolves through various release and maintenance cycles.

In some instances, a company may use the GPR model to define company-wide products, product versions, components and maintenance levels, along with related attributes governing dependencies and distribution aspects. The file definition model then contains the blueprint for file and directory installation, mapping each file in the installer payload to its final destination on the customer's system. There are many attributes, including rules and filters, governing the mechanics of file installation. In some instances an XML file embodies the file definition model and a separate file exists for each product. The file definition model is an important part of the extended Product Provisioning Model. Furthermore, the file definition model is critical to a change required to support shared modules.

Traditionally, the GPR was designed based on current product usage and projected product requirements extrapolated from current practice and company vision. However, aspects of the model and related definition of meta-data were influenced by the Platform vision. In the field of enterprise software systems, such as application servers, most software companies ship their products on a Platform paradigm, wherein the products are generally sold as a platform or suite of products. As such, updates to a portion of the platform or suite must be coordinated so that they do not conflict with other portions of the platform or suite. Two primary areas reflect the Platform influence, both being derived from the goal to establish a seamless user install and out-of-the-box (OOTB) configuration experience, and supporting the marketing of a single platform with high-level components that are tightly coupled. The Platform influence impacted product distribution by the creation of a high level suite concept serving as the product entity. This forced characterization of the layered products as components of a Platform product rather than individual products working cohesively together under the Platform umbrella. A marketing brand or generalized Stock Keeping Unit (SKU) became the de facto product, while the actual products were designated as components, one level lower in the overall product hierarchy.

The Platform influence also involved the planned practice of layered product homogeneity. This is a derivative of the suite concept together with enforcement of a standard versioning structure and semantic. Using this paradigm, products conform to a major.minor.servicepack.patch version, with active enforcement of the first three levels (the patch portion is not enforced in the product version string). This effectively forces a train-like model, wherein all Platform components have to release together for a given major.minor version. The Platform can release without including all components and can release asynchronously (staggered release of components), however versioning must remain consistent. This adheres to a well established principle that a component software change necessitates a version change.

The Platform paradigm can work well in some instances. However, the Platform paradigm can also complicate the process of providing updates, and cause delays in providing those updates to the end customer. Current platform-type components require a more agile distribution system. As such, disclosed herein is a system and method for software product packaging, distribution, and patching.

Flexible Product Packaging

In accordance with an embodiment, a system and method for flexible product packaging is disclosed. Software companies have a growing need for greater business agility to opportunistically create bundled software distribution packages that map to SKU's consisting of new permutations of available products. For example, in the context of an application server software company, a Platform and Service Bus product may use a shared version of an Application Server product. Similarly, a Studio product may be bundled along with the Platform product.

Many software companies also require the ability to create arbitrary external product brand names and versions, while standard Product Provisioning operations require normalized internal product names and versions. Structured Product Provisioning data is essential to preserve the ability to upgrade and patch products consistently, enable customer provisioning automation, and maintain reasonable supportability of the different products. For example, version 1.1 SP5 and version 1.5 of a particular product may provide the same content, but use a different name for marketing purposes.

In some software companies, the architectural direction of their product line dictates modularity and modular product distributions. For example, in an OSGi related product, distributions may contain modules, also known as bundles in OSGi parlance. Modules are very granular, and consequently require (1) a higher level intuitive semantic for purpose of dependency declaration between function module groups as well as (2) a simplified method of starting OSGi-based runtime applications.

In many traditional systems, provisioning code depends on a product registry file located in a home registry. The registry contains information about products and the environment upon which products depend, e.g. specification of necessary virtual machines. Many values and related semantics correspond to values in the GPR however the registry is based on a separate model (wherein references herein to the GPR are synonymous with references to the Product Model). This is reflected in processing prevalent throughout the install framework.

In accordance with an embodiment, the system provides for convergence of the GPR and registry models, adding critical information to the home registry and simplifying processing algorithms in the install framework. This allows a business to enforce cross-product dependencies during un-installation, and facilitates an interface to create a list of modules along with normalized start levels based on activation requests for products, components or specific features.

In accordance with an embodiment, a Product Alias element is added to the Product Provisioning Model, referencing one or more products. This provides a loose coupling between the external market-oriented product name and version and the internal product names and versions. The internal product names and versions are captured in the registry and used for all code-based decisions during installation and other provisioning related activities.

In accordance with an embodiment, a Feature Model is also added to the Product Provisioning Model. A feature is referenced by components in the Product Model and serves as a bridge linking install and runtime aspects of an artifact or module. Features are versioned and contain a group of versioned modules.

In accordance with an embodiment, modules are grouped under features. Modules can be designated as being "shared". Shared modules do not belong to any specific product but rather are targeted for distribution with two or more products requiring the same unit of functionality.

Figure 1:
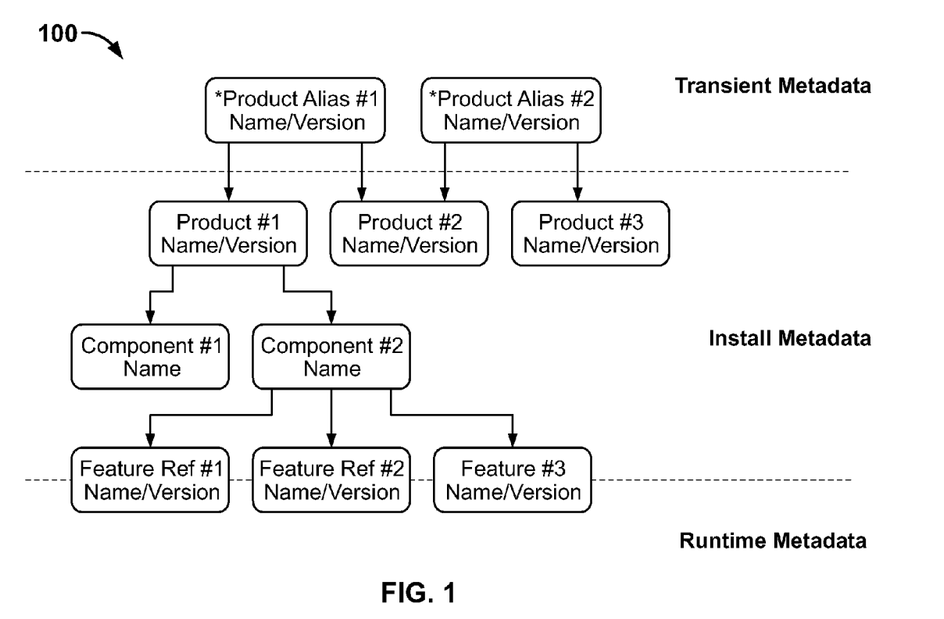
FIG. 1 shows an illustration of a provisioning model including a product meta-data in accordance with an embodiment.

FIG. 1 shows an illustration of a provisioning model 100 including a product meta-data in accordance with an embodiment. As shown in FIG. 1, a product alias can refer to one or more products. This does not imply product parentage. The official root of the hierarchical product model begins with a product element. Product aliases provide for marketing flexibility, and consistent methods of identifying software artifacts for purpose of installation, un-installation, upgrade and patch. The product alias name and version is unreliable for purpose of code and tool based detection and automation, i.e. the versioning scheme may not follow a rational, uniform syntax or be predictable with a consistent, monotonic, incrementing of the version number. In accordance with an embodiment, a product alias enables creation of a product suite from a group of products. The layer of abstraction also removes the need to modify product names and versions with each new suite permutation. This facilitates a consistent semantic for customer use, e.g. when contacting support, or when interfacing with a Patch Management system.

Product Alias

In accordance with an embodiment, a product alias can be used with a Platform distribution. For example, in an application server Platform product suite, products such as the Application Server product and Portal product can be artificially treated as components, with the Platform defined as the parent product. This creates logistical problems shipping the constituent components asynchronously with independent versioning. Consequently, the ability to ship products is limited. The impact is magnified when considering product differences that dictate different optimal frequency of product releases. For example, one product may optimally have releases at 3-month intervals, while another product may optimally have releases at 9-month intervals.

As another example, in some instances a Service Bus product may depend on a Application Server product, and is usually shipped as a distribution containing both components. To allow both the Platform and Service Bus products to be patched efficiently and consistently, and to coexist in the same home registry, the Service Bus distribution is defined by declaring the product to be Platform. This distribution then contains the Application Server and Service Bus components. As with the earlier example, this impacts the ability to ship product based on an optimal development cycle, since one has to consider the impact on the overall Platform version when shipping.

In accordance with an embodiment, product aliases are defined in a Global Product Registry (GPR). The GPR contains a separate section for each product alias, which in turn contains references for each included product.

Product Versions

In accordance with an embodiment, the term "product" defines the lowest level of granularity for a complete software offering targeted for customer consumption. More than one SKU may be defined for a given product based on product features enabled and usage characteristics of the features, for example constraints placed on features to restrict usage to a development scenario.

The product element serves as a container for a group of components. In order to effectively deliver a product for customer consumption, components must be grouped and referred to by an immutable name and version. This is required in order to develop and release product according to a standard lifecycle methodology. Orderly and automated installation, un-installation, upgrade and patching of products also requires a normalized naming and versioning scheme. Moreover, this facilitates a consistent interface for customers and effective customer support.

A product may contain a mixture of components used exclusively by this product as well as components containing shared modules that can be used by multiple products.

In accordance with an embodiment, products are defined in the GPR. The GPR contains a separate section for each version of a given product, including service/maintenance pack versions.

Software Components

In accordance with an embodiment, the term "component" defines a functionally specific group of software executables and artifacts designed to provide customized product installation options. Installation options enable various customer use cases. A product may contain optional features that are appropriate only for specific use cases. Providing the ability to optionally install enables a reduction in the footprint on disk and may reduce the download footprint. Optional installation may also facilitate a development versus production product image. In the case of a production installation, it may be necessary to avoid installation of certain components whose presence represents a security vulnerability according to local policy.

Components can define dependencies on other components, including components belonging to different products. Multiple dependencies can be expressed using a logical "and/or" semantic. Regular expressions are supported. Components also contain feature references. Features in turn define dependencies, which are inherited by the parent component. Based on dependencies, components may be automatically selected or de-selected in installation and un-installation scenarios. Moreover, installation and un-installation errors or alerts are generated when dependencies span products. In accordance with an embodiment, components are defined in the GPR.

Software Features

Figure 2:
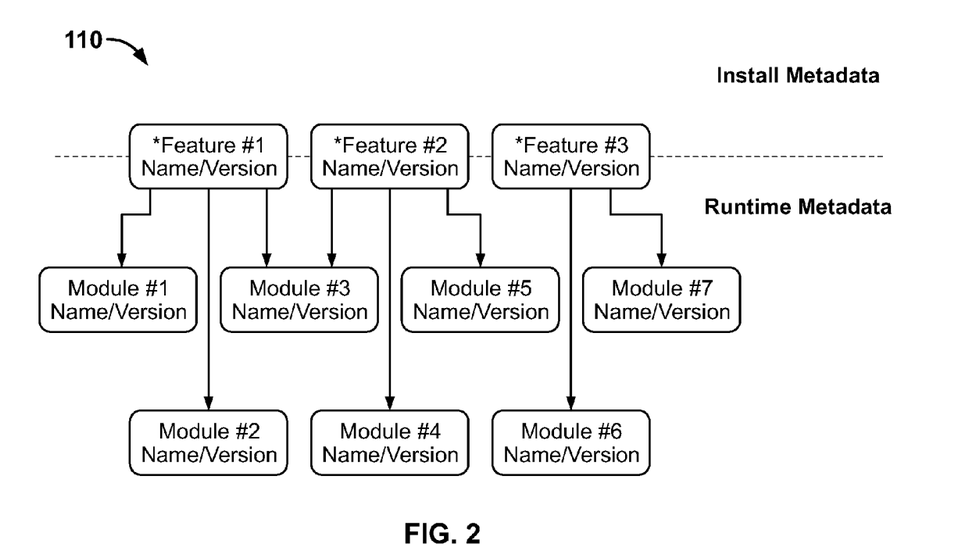
FIG. 2 shows an illustration of a provisioning model including a feature meta-data in accordance with an embodiment.

FIG. 2 shows an illustration of a provisioning model 110 including a feature meta-data in accordance with an embodiment. As shown in FIG. 2, the Feature Model is joined to components in the Product Model via feature references. Using this model, components can be viewed as being composed of features, rather than dependent on them. Features depend on features, but do not depend on any entity in the product model. This provides a loose coupling between the Product Model and Feature Model, mapping runtime and install elements.

In accordance with an embodiment, a feature defines a container element for modules as well as inter-feature dependencies. Features must be versioned as they are stand-alone entities, not subject to any higher level element. A particular feature version contains one to many module versions that are functionally related and certified as compatible. In accordance with an embodiment, features are the primary entity used to identify modules to start in an OSGi environment.

In accordance with an embodiment, Feature Definitions adhere to a schema-based model allowing definition of constituent modules and feature dependencies. Each module entry contains a module name, optional start level and shared module indicator. When the system processes module entries, the module start level determines the sequence of module activation. The model also permits declaration of dependency elements capturing relationships between feature versions.

In accordance with an embodiment, several files support feature definition and dependencies. An XML Feature Definition file embodies the Feature Model. A separate file exists for each feature version and adheres to the naming convention <featurename>_<4positionversion>.xml.

A jar file is automatically generated during an installer build for each feature version. The jar file consists solely of a manifest with a classpath entry containing all modules listed in the Feature Definition file. Non-OSGi based runtime systems can use the jar files to systematically create the appropriate classpath. The jar adheres to the naming convention <featurename>_<4positionversion>.jar.

Optional feature-set jars hold manifest classpath references to a collection of related feature jars. A feature-set jar adheres to the naming convention <featurename>.feature.set_<4positionversion>.jar.

Feature dependencies define mandatory relationships between groups of software executables and artifacts. Multiple dependencies can be expressed using a logical "and/or" semantic. Regular expressions are not required for features, as dependencies are very direct. In contrast, regular expressions are supported for the component element, as both products and components are expressed in dependency relationships associated with components.

In accordance with an embodiment, logical "not" dependencies enable handling of mutual exclusion use cases. A Feature Exclusion model captures these exclusions. Separate modeling of exclusions avoids heuristics and performance problems inherent with inclusion of this dependency type in the base dependency graph. Exclusions are processed after completion of base graph processing.

It will be noted that feature dependencies are independent of OSGI-based module dependencies, which are highly code dependent from a syntactical perspective. Feature dependencies relate to a logical dependency, e.g. one module writes a particular configuration file or entry in a configuration file that is required by another module. In this example, OSGI-based semantics cannot capture the dependency.

A strong relationship exists between runtime dependencies and installation artifacts and this manifests itself in the relationship between feature and component dependencies. Installation dependencies are a derivative of runtime requirements. The installer build process automatically percolates Feature Definition dependencies to relevant component entries in the Product Model. Component dependencies drive installation file processing.

In accordance with an embodiment, features are defined in a separate model. Feature references coded under the component element in the GPR provide linkage between the Product model and Feature Model. Components are composed of features.

Software Modules

In accordance with an embodiment, a module is an OSGi-compliant file or other archive that can be directly loaded and used. For example, a module may be an OSGi bundle, a jar intended for use on the classpath of a Java-based runtime system, or a WLS shared library. A module must contain an embedded version in its file name. Each module provides very granular functionality.

A special type of module, referred to as a shared module, provides common functionality targeted for use by two or more products. In accordance with an embodiment, shared modules install under the home registry rather than a specific product directory. The installer tracks usage for each shared module via a reference count, since multiple products can depend on the same module. Reference counting prevents premature un-installation of shared modules required by an active, installed product. A separate file contains reference counts for all shared modules installed into a given home. This file resides either under the home or a well-known subdirectory of the home. This use of a separate file tracking all shared modules with associated reference counts, rather than storing associated data in an existing meta-data file, provides efficient access to reference counts.

Product Provisioning Examples

Figure 3:
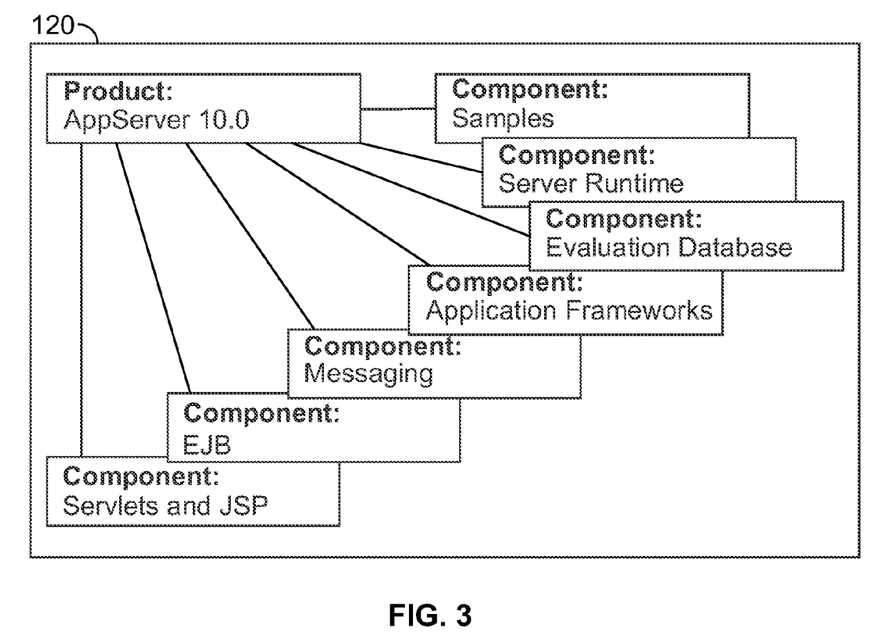
FIG. 3 shows an illustration of a provisioning model including conceptual examples of a product to component mapping in accordance with an embodiment.

FIG. 3 shows an illustration of a provisioning model 120 including conceptual examples of a product to component mapping in accordance with an embodiment. As shown in FIG. 3, a software product such as an application server (in this example an Application Server version 10.0), can be mapped to a plurality of components, such as Samples, Server Runtimes, Evaluation database, Application Frameworks, Messaging, EJB, and Servlets and JSP components.

Figure 4:
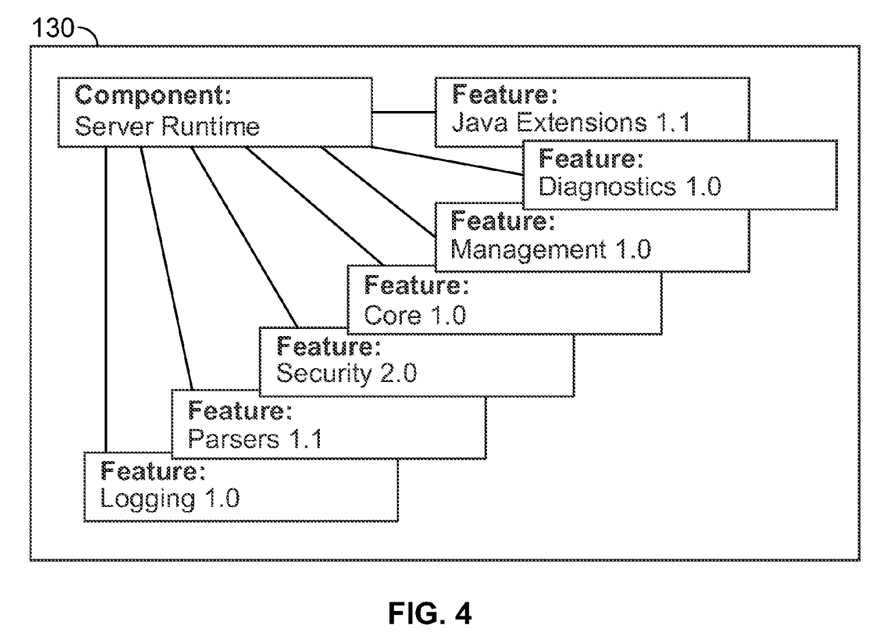
FIG. 4 shows an illustration of a provisioning model including conceptual examples of a component to feature mapping in accordance with an embodiment.
Figure 5:
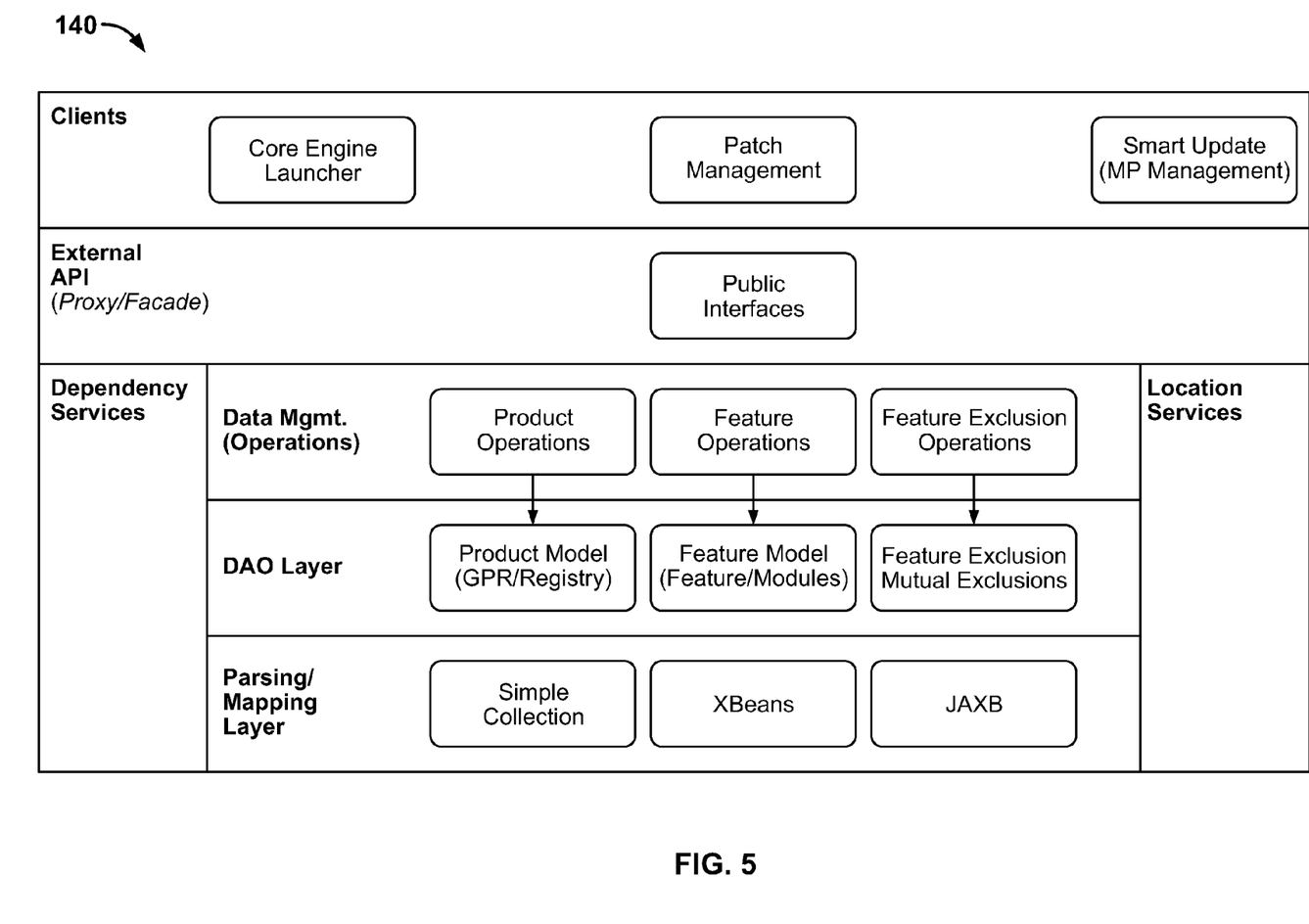
FIG. 5 shows an illustration of a system that includes a Product Provisioning model in accordance with an embodiment.

FIG. 4 shows an illustration of a provisioning model 130 including conceptual examples of a component to feature mapping in accordance with an embodiment. As shown in FIG. 4, a software product runtime (in this example a Server Runtime), can be mapped to a plurality of features, such as Java Extensions 1.1, Diagnostics 1.0, Management 1.0, Core 1.0, Security 2.0, Parsers 1.1, and Logging 1.0. This information can also be represented in a module mapping list for a particular product, for example:

com.core.utils.classloaders_1.0.0.0.jar
com.core.utils.expressions_1.1.0.0.jar
com.core.utils.full_1.0.0.0.jar
com.core.utils.wrapper_1.1.0.0.jar
com.core.utils_1.0.0.0.jar System for Flexible Product Packaging FIG. 5 shows an illustration of a system 140 that includes a Product Provisioning model in accordance with an embodiment. As shown in FIG. 5, an embodiment of the system comprises clients, external API, dependency services, and location services layers. The dependency and location services layers further comprise a data management and operations layer (including product operations, features operations, and feature exclusion operations), DAO layer (including product model, feature model, and feature exclusion) and parsing/mapping layer (including simple collection, XBeans, and JAXB). The external API layer includes public interfaces. The clients layer includes a core engine launcher, patch management, and smart update). In accordance with an embodiment, the Core Engine specifies the syntax and semantic for shared module versions (OSGi bundles). The paraphrased version syntax can be defined as:

[major-release].[minor-release].[maintenance-pack].[sequential-patch-number].

In accordance with an embodiment, a Patch Management System is used to provide support for multiple patch types/methods relevant to module patching. Business and technical use cases, along with policy, can be used to drive selection of the most appropriate method.

In accordance with an embodiment, the Patch Management System generates a random unique Patch ID for each created patch. The random nature of the ID supports either a one-off, or a rolling patch model. Rolling patch semantics can be communicated to the customer via the Patch Description field and further clarified by using UI characteristics of the Smart Update Tool that depict Critical versus Optional patch groupings.

For shared modules consumed by the Core Engine, a complete replacement patch type can be used if it is decided to support a rolling patch model for these modules. Although classified as a replacement patch type, from a file system perspective, this involves installing a new module. This patch method holds the greatest negative impact for patch repository footprint, customer system footprint, and any operation requiring transport of the patch, or patch sets containing multiple modules. It may also require additional manual handling by the customer to load the new patch module for runtime usage.

In accordance with an embodiment, a model for shared module patching can use replacement patches via an injection process supported by the Patch Management system. This method addresses the footprint issue, and provides support for a one-off model.

In accordance with an embodiment, the Patch Management System provides support for other patch installation patch types, e.g. classpath patching, path and libpath patching. The diversity of patch types provide flexibility for several different support models, e.g. one-off patches, full rolling patches and rolling patches for a particular class of patches.

In accordance with an embodiment, the Feature/Module Runtime Registry API provides location independent access to product module registries and the means to start groups of modules using customer-friendly semantics. In accordance with an embodiment, an initial consumer of the API is the Core Engine Launcher. However, the interface and implementation are generic, allowing potential use by any engine or server predicating system start on modules.

In accordance with an embodiment, the API provides a factory method returning a configuration object. The configuration object provides a method that returns a module list based on supplied parameters including product, component and features. The high level parameters, e.g. features, used in the interface insulate customers and internal developers from having to understand and specify the full set of modules upon which they are dependent. Product teams with intimate knowledge of their modules can group these together under intuitive features.

In accordance with an embodiment, the API normalizes module start levels across products. Module start levels defined by each development team are relative within a product. Creation of static module lists with start levels normalized across all product permutations would be extremely complex, error prone and require constant maintenance. The API can use a feature dependency graph to create a global module start order spanning products.

In accordance with an embodiment, the archive containing implementation classes for the API must be on the primordial classpath, i.e. the same classpath used to start the microkernel and launcher. This allows bootstrap of the launcher and ensures knowledge of the home location, wherein the home is the root of all critical bootstrap metadata.

Patch Management for Modules

In accordance with an embodiment, a Patch Attachment for Modules feature is provided. As referred to herein a Patch Profile refers to a collection of compatible patches. A Default Patch Profile refers to the collection of compatible patches applied without specification of a specific profile. In typical usage, patches are applied to the default profile and product runtimes automatically load the patches contained therein. A Custom Patch Profile refers to a collection of compatible patches applied to a customer-specified profile.

In accordance with an embodiment, the Patch Management System permits creation of many custom patch profiles. Runtime use of a custom patch profile typically requires special configuration flags or settings, which also may limit the scope of effect for the profile to an entity smaller than the entire product. For example, a specific custom patch profile may affect only one server instance out of many instances. Classpath patching enables very granular patching of artifacts with a corresponding small download footprint. In accordance with an embodiment, the Core Engine is based on a framework for managing applications specified by an open standards organization known as the Open Services Gateway initiative (OSGi). This framework does not support deterministic loading of duplicate classes spread across multiple jars/modules. Consequently, Core Engine patches must be delivered via a complete module.

In accordance with an embodiment, a "module" patch type is required in the Patch Management System to accommodate patching of entities referred to as modules or bundles. The source artifact for inclusion in the patch is a module or modules. Modules are selected from the file system via a file system tree view in a similar fashion to selection of archives for patches of the type "classpath". The selected archives are then targeted to module entries. Each module entry consists of a module name with an embedded version in the name. Targeting can include providing a user interface that enables association of the source archive with a target module name.

In accordance with an embodiment, when creating a module patch, two options are presented to the engineer for selection in the user interface. At least one of the options must be selected, and both can be selected. The options include: "Load via classpath"; and "Load via OSGi". Similar to classpath patches, only changed artifacts are included in the patch archive. All other aspects of patch creation align with processing for other existing patch types.

The patch payload for module patches closely mirrors that of classpath patches. Installation of module patches for classpath loading is similarly indistinguishable from pure classpath patches. However, a module patch differs in its ability to create a patch for consumption by an OSGi launcher. Artifacts are included in the patch classpath using the existing patch management system mechanism applicable for classpath-based patching. This provides continuity in processing for existing customers. In contrast to the classpath ordering paradigm, OSGi does not have the ability to deterministically load the same class from multiple jars/modules. Instead, a complete module containing patched classes must be provided. In accordance with an embodiment, the following steps can be used to create a complete module on the target system using essentially the same patch payload created for classpath patches.

1. Duplicate the target module residing on the customer's system, placing this in the default patch profile, or patch profile explicitly selected by the customer. Note that the process of duplication does not result in a file name change. This ensures that no module references require modification.

2. Inject artifacts (classes) from the downloaded patch payload into the duplicated module.

3. Track artifacts injected into the patched module by populating entries in the patch backup definition file. This file is located in the patch directory specific to the product/release/maintenance pack level targeted by the patch.

4. Track the sequence of patches applied to the module. The logic supporting sequence tracking must handle the use case where a customer performs un-install of a patch that is not the latest patch applied. For example, given 5 patches applied to a specific module, the customer performs un-install on the second of the 5 patches applied from a chronological perspective. Note that this approach doesn't require physical backup of the artifacts in the patched module, as the injected artifacts still reside in the patch directory. The control information residing in the patch backup definition file together with the ability to re-inject patches into the module supports all known un-install scenarios.

5. Update the patch module list under the "patch" subdirectory of the common modules directory located in the home. This module list contains entries for each patched module and identifies the product/release/maintenance pack association for the module, along with the patch profile under which the module resides.

In accordance with an embodiment, module patches can be applied to custom profiles, consistent with other patch types. Runtime processing of module patches differs depending on the system used to load modules. Similar to patch installation, runtime processing of module patches loaded via the classpath mirrors processing of typical classpath patches. The customer should not perceive a difference unless they closely inspect internal meta-data.

Different processing applies to modules delivered via the Patch Management System and loaded by the Core Engine OSGi-based Launcher. A Launcher derives a list of modules to start by processing feature requests using a Feature Registry API, referred to as the Launcher module start list. For context, feature sets (also referred to as features) are versioned sets of functionally related modules that can express dependencies on other features. Features also have product affinities.

In accordance with an embodiment, after compiling a list of modules and prior to returning this to the Launcher, the Feature Registry API compares the patch module list, created during patch installation, to the Launcher module start list. If a module matches on version and product association, the entry from the patch module list replaces the corresponding entry in the Launcher module start list. Note that the module version is embedded in the module jar file name. The file object representing the patched module is created using information from the module start list.

In accordance with an embodiment, to accommodate use of custom patch profiles, the Launcher adds an optional flag to allow the customer to select a custom patch profile. Concurrently, the Feature Registry API must provide the ability to optionally specify a custom patch profile applicable to module requests.

Patch Attachment Facility

In accordance with an embodiment, a Patch Attachment Facility is provided. The Patch Attachment Facility provides mechanism to add patch installation as a loosely coupled yet cohesive part of standard software product installation. The Patch Attachment Facility also provides the ability to easily configure this option as part of routine meta-data modifications to install projects.

In accordance with an embodiment, during Build Activation, the software developer or the software vendor should provide the ability to enable patch attachment facility via a build/project file switch. The XML file embodying the installer patch model should be located in a well-known location in the install build directory structure. The installer patch model's XML file can be referenced from a build/project file variable. During Patch Install Model and Usage, the developer or software vendor should provide the ability to specify patches with component relationships via a schema-based model exposed in XML.

Patch installation is filtered at two levels, i.e. execution level and individual patch level.

The Execution Level determines if a set of patches should be evaluated for installation. The list of patches is scoped at a component level. Multiple components and associated patch lists can be included as part of the single installer patch model instance. Patches listed under a given component are evaluated if the component is already installed on the system or has been selected during the current installation session.

The Individual Patch Level assumes completion of the Execution Level check, and that the check indicates to evaluate individual patch entries for installation. Each patch entry identifies the patch ID. When the installer is built, the patch ID is used to query the Patch Catalog to extract the product to which the patch applies. Patch meta-data is updated to make this information available to the installer at runtime. The Patch Management System does not associate patches with installed components, thus the system must check against product when determining if it is appropriate to install a patch, i.e. whether the patch application is meaningful given the installed products on the system. An alternative to this paradigm is to require a dependent component semantic in the install patch model. Weighing likelihood and ramifications of installing a patch that is effective only for an optional component that is not installed on the target system, although the parent product is installed; as compared with a requirement to manually identify dependencies in the install patch model. An alternative design choice is automatic detection of a product rather than checking component and requiring that this be included in the patch install model.

In accordance with an embodiment, the patch ID is used to query the Patch Management System to determine if the patch is already installed. However, this information is required relatively early in the installation process, possibly before the Patch Management System has been installed on the system. To determine if the patch has already been installed, the installer can first check if the product to which the patch applies has been installed. If not, it assumes the patch has not been installed. Otherwise, the product uninstall definition is inspected to determine if the patch was installed via the installer invoked patch process. If the patch is found in the uninstall definition, then the definition is updated to reflect newly installed components that require the patch. If the patch was not found in the uninstall definition, assume it is not installed. This might select patches that have already been installed manually by the administrator, a situation that will be detected later.

If the product that a patch applies to is already installed on the system, or has been selected during the current installation session, then the patch is selected for installation.

Once the patch is successfully installed via the installer invoked patch process, an uninstall definition can be created, including for example: a Patch ID; Evaluation level component; and Individual patch level product.

If the patch has already been installed via the installer invoked patch process, then the uninstall definition for the patch should be updated to reflect another individual patch level component association.

The installer patch model should provide the ability to define the order in which each patch is applied relative to the full list of patches. Patch ordering is independent of component association.

Patch payloads are packaged with the components that require them, and are copied to the patch cache directory via a normal file copy task.

Client libraries required for the patch attachment facility are installed with a common component and are dynamically added to the installer class path by a task that runs after the file copy task.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that while some of the examples described herein illustrate how the features may be used in a WebLogic application server environment, it will be evident that the systems and techniques can be use with other types of application server, enterprise system, software platform, suite, or software product. The code examples given are presented for purposes of illustration. It will be evident that the techniques described herein may be applied using other code languages, and with different code.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for software product packaging, distribution, and patching, comprising:
    a computer including a microprocessor and a storage medium;
    a product registry for use in storing and distributing information about a plurality of different software products or versions thereof, wherein the product registry includes an install metadata, that defines
        a product model, including a plurality of software components for use by the software products or versions thereof, including, for each of the plurality of different software products or versions thereof, an indication of those software components that form said each of the plurality of different software products or versions thereof,
        a product alias element used to reference the plurality of different software products or versions thereof to provide a coupling between an external market-oriented product name and version and a plurality of internal product names associated with the plurality of different software products or versions thereof,
        a feature model, including feature reference data, including, for each of the software components, an indication of one or more features of that software component, wherein each feature has a version associated therewith,
        a runtime metadata, that defines a plurality of modules that can be provisioned at runtime including, for each version of a feature, an indication of those modules that provide that version of the feature,
        wherein the information in the product registry can be updated to include information about a new software product or version thereof, and used, by joining features defined by the feature model to components defined by the product model via the feature reference data, to provision the new software product or version thereof for a customer according to the information in the product registry; and
    a patch management system which generates a random unique patch identifier (ID) for each of a plurality of patches, whereby the patch management system is configured to support either a one-off or a rolling patch model to enable patching of the plurality of modules that can be provisioned at runtime;
    wherein, where one or more of the plurality of modules have been patched using the patch management system to generate one or more patched modules, the runtime metadata is modified to reference the one or more patched modules.

2. The system of claim 1, wherein the plurality of internal product names associated with the plurality of different software products or versions thereof are captured in the product registry and used for all code-based decisions during installation and provisioning.

3. The system of claim 1, wherein each of the features has a version information associated therewith, and wherein the version information specifies one or a plurality of versions of the modules that are defined to be compatible with one another.

4. The system of claim 1, wherein each of the one or more different versions of a software product of the plurality of different software products or version thereof is defined by a feature definition file that is used by an installer process in creating a build of the software product to populate a JAR or other archive with information about modules in the feature definition file.

5. The system of claim 4, wherein the feature definition file further defines feature dependencies, including any requirement that other modules be present in the build.

6. The system of claim 1, wherein each of the modules is one or more of an OSGi-compliant module, OSGi bundle, Java archive (JAR), shared library, or other archive that can be directly loaded and used by the system.

7. The system of claim 1, wherein the product registry is provided as a schema that can be parsed to determine the configuration of the new version of the software product.

8. The system of claim 1, wherein products are defined in the product registry, and wherein the product registry contains a separate section for each version of a given product, including service/maintenance pack versions, and patches installed or available for that version.

9. The system of claim 1, wherein the product registry includes semantic definitions that define component dependencies on other components, and relationships between groups of software executables and artifacts.

10. A method for software product packaging, distribution, and patching, comprising the steps of:
    providing a product registry for use in storing and distributing information about a plurality of different software products or versions thereof, wherein the product registry includes an install metadata, that defines
        a product model, including a plurality of software components for use by the software products or versions thereof, including, for each of the plurality of different software products or versions thereof, an indication of those software components that form said each of the plurality of different software products or versions thereof, a product alias element used to reference the plurality of different software products or versions thereof to provide a coupling between an external market-oriented product name and version and a plurality of internal product names associated with the plurality of different software products or versions thereof, a feature model, including feature reference data, including, for each of the software components, an indication of one or more features of that software component, wherein each feature has a version associated therewith, and a runtime metadata, that defines a plurality of modules that can be provisioned at runtime including, for each version of a feature, an indication of those modules that provide that version of the feature;

updating the information in the product registry to include information about a new software product or version;

providing a patch management system which generates a random unique patch identifier (ID) for each of a plurality of patches, whereby the patch management system is configured to support either a one-off or a rolling patch model to enable patching of the plurality of modules that can be provisioned at runtime;

modifying said runtime metadata to reference one or more patched modules, where one or more of the plurality of modules have been patched using the patch management system to generate said one or more patched modules; and provisioning the new software product or version thereof for a customer according to the information in the product registry by joining features defined by the feature model to components defined by the product model via the feature reference data.

11. The method of claim 10, wherein the plurality of internal product names associated with the plurality of different software products or versions thereof are captured in the product registry and used for all code-based decisions during installation and provisioning.

12. The method of claim 10, wherein each of the features has a version information associated therewith, and wherein the version information specifies one or a plurality of versions of the modules that are defined to be compatible with one another.

13. The method of claim 10, wherein each of the one or more different versions of a software product of the plurality of different products or version thereof is defined by a feature definition file that is used by an installer process in creating a build of the software product to populate a JAR or other archive with information about modules in the feature definition file.

14. The method of claim 13, wherein the feature definition file further defines feature dependencies, including any requirement that other modules be present in the build.

15. The method of claim 10, wherein each of the modules is one or more of an OSGi-compliant module, OSGi bundle, Java archive (JAR), shared library, or other archive that can be directly loaded and used.

16. The method of claim 10, wherein the product registry is provided as a schema that can be parsed to determine the configuration of the new version of the software product.

17. The method of claim 10, wherein products are defined in the product registry, and wherein the product registry contains a separate section for each version of a given product, including service/maintenance pack versions, and patches installed or available for that version.

18. A non-transitory computer readable storage medium including instructions stored thereon for supporting software product packaging, distribution, and patching, which instructions, when read and executed by a computer, cause the computer to perform steps comprising:

providing a product registry for use in storing and distributing information about a plurality of different software products or versions thereof, wherein the product registry includes an install metadata, that defines a product model, including a plurality of software components for use by the software products or versions thereof, including, for each of the plurality of different software products or versions thereof, an indication of those software components that form said each of the plurality of different software products or versions thereof, a product alias element used to reference the plurality of different software products or versions thereof to provide a coupling between an external market-oriented product name and version and a plurality of internal product names associated with the plurality of different software products or versions thereof, a feature model, including feature reference data, including, for each of the software components, an indication of one or more features of that software component, wherein each feature has a version associated therewith, and a runtime metadata, that defines a plurality of modules that can be provisioned at runtime including, for each version of a feature, an indication of those modules that provide that version of the feature;

updating the information in the product registry to include information about a new software product or version thereof;

providing a patch management system which generates a random unique patch identifier (ID) for each of a plurality of patches, whereby the patch management system is configured to support either a one-off or a rolling patch model to enable patching of the plurality of modules that can be provisioned at runtime;

modifying said runtime metadata to reference one or more patched modules, where one or more of the plurality of modules have been patched using the patch management system to generate said one or more patched modules; and provisioning the new software product or version for a customer according to the information in the product registry by joining features defined by the feature model to components defined by the product model via the feature reference data.

19. The non-transitory computer readable storage medium of claim 18, wherein the plurality of internal product names associated with the plurality of different software products or versions thereof are captured in the product registry and used for all code-based decisions during installation and provisioning.

* * * * *

UNITED STATES PATENT AND TRADEMARK OFFICE
CERTIFICATE OF CORRECTION

PATENT NO. : 9,477,462 B2  
APPLICATION NO. : 12/355681  
DATED : October 25, 2016  
INVENTOR(S) : Felts Page 1 of 1

It is certified that error appears in the above-identified patent and that said Letters Patent is hereby corrected as shown below:

On page 2, Column 2, under Other Publications, Line 32, delete "Cederovist" and insert -- Cederqvist --, therefor.

On page 2, Column 2, under Other Publications, Line 37, delete "Gatewa" and insert -- Gateway --, therefor.

In Column 7, Line 67, delete "subdirectory" and insert -- sub-directory --, therefor.

Signed and Sealed this  
Thirteenth Day of June, 2017

Joseph Matal  
*Performing the Functions and Duties of the*  
*Under Secretary of Commerce for Intellectual Property and*  
*Director of the United States Patent and Trademark Office*